May 5, 1970 J. P. O'NEILL ET AL 3,510,705
VARIABLE FORCE MAGNETIC HYSTERESIS DEVICE
Filed Aug. 14, 1967
2 Sheets-Sheet 1
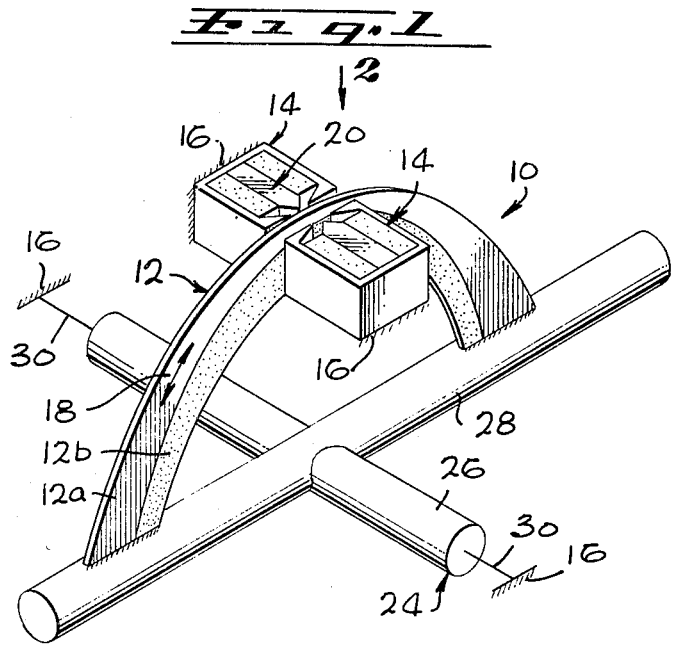
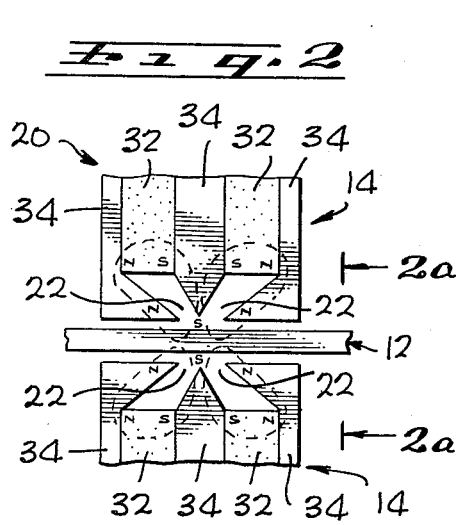
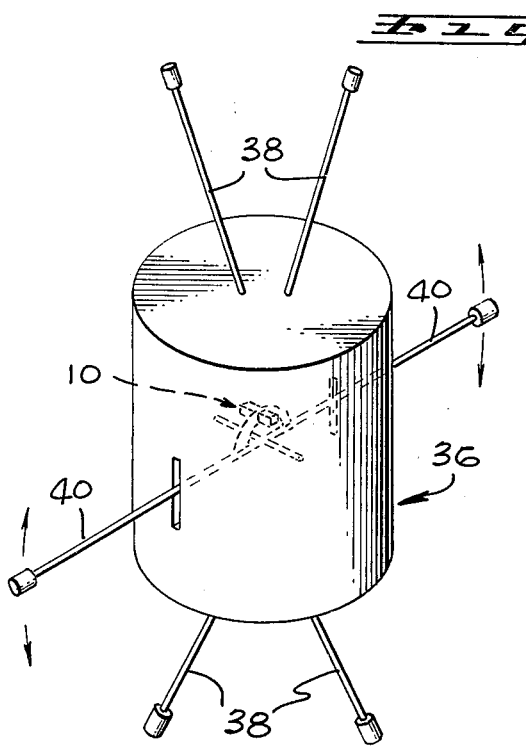
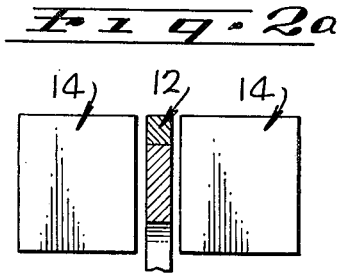
INVENTORS
JAMES P. O'NEILL
WILLIAM S. TIERNEY
BY
Donald R. Nyhagen
ATTORNEY

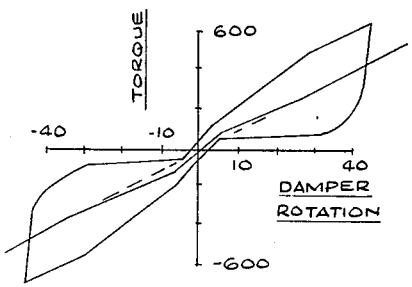
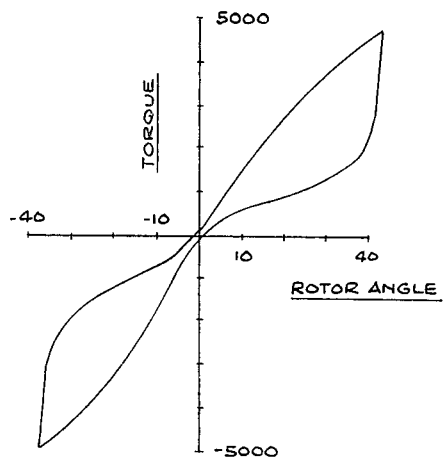
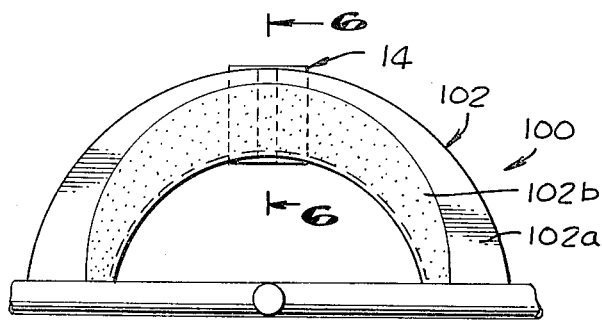
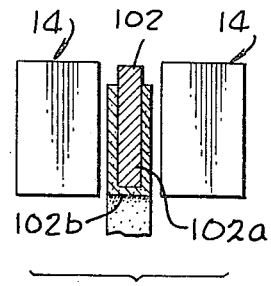
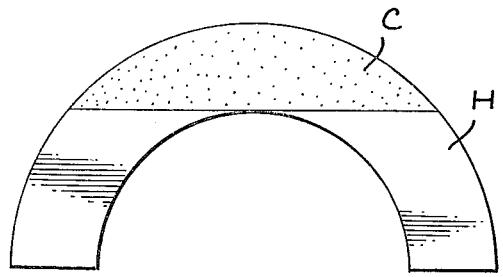
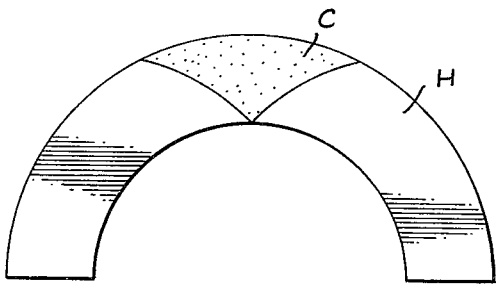

United States Patent Office 3,510,705
Patented May 5, 1970

3,510,705
VARIABLE FORCE MAGNETIC HYSTERESIS DEVICE
James P. O'Neill, Playa Del Rey, and William S. Tierney, Torrance, Calif., assignors to TRW Inc., Redondo Beach, Calif., a corporation of Ohio
Filed Aug. 14, 1967, Ser. No. 660,305
Int. Cl. H02k 49/04
U.S. Cl. 310—93                                18 Claims

ABSTRACT OF THE DISCLOSURE

A magnetic hysteresis device having a magnetic hysteresis member and at least one magnetizing head supported for relative movement in such a way that energy is dissipated within the member by magnetic hysteresis to produce a hysteresis drag force opposing the relative movement, and drag force modulating means, whereby the hysteresis drag force varies in accordance with a predetermined function of the relative displacement of the member and head. A magnetic hysteresis device of this kind wherein the hysteresis member varies in effective cross-section to provide the drag force modulating means and includes a mass of magnetic material characterized by a low hysteresis loss and varying effective cross-section for providing a non-dissipative compensating magnetic spring force opposing the non-dissipative magnetic spring bias force active between the member and magnetizing head in the direction of their relative movement as a consequence of the varying effective cross-section of the hysteresis material of the member.

REFERENCE TO COPENDING APPLICATIONS

Reference is made herein to copending application Ser. No. 454,365, filed May 10, 1965, now U.S. Pat. No. 3,416,749 and entitled "Magnetic Hysteresis Apparatus."

BACKGROUND OF THE INVENTION

Field of the invention

This invention relates generally to magnetic hysteresis devices of the class wherein relative movement of two members induces an energy loss in one member by magnetic hysteresis to produce a hysteresis drag force opposing the relative movement. The invention relates more particularly to such a magnetic hysteresis device which is characterized by a hysteresis drag force that varies in accordance with a predetermined function of the relative displacement of the members.

Prior art

Magnetic hysteresis devices of the class to which this invention pertains are known in the art and are useful as drives, brakes, dampers, and the like. Generally speaking, such devices are characterized by a magnetic hysteresis member and at least one magnetizing head supported adjacent to a surface of the member for relative movement of the member and head along a direction line parallel to the surface. The head includes magnetic circuit means which provide a number of magnetic field regions of varying polarity arranged in a sequential array along the path of relative movement of the hysteresis member with respect to the magnetizing head. In any given relative position of the member and head, therefore, those magnetic domains within the member which are located in the magnetic field regions of the head assume a magnetic orientation corresponding to the polarity of the magnetizing fields in their respective field regions. During relative movement of the hysteresis member and magnetizing head, at least some of these magnetic domains pass from one field region to another in such a way that the domains are exposed to one or more magnetic field changes or reversals which work or cycle the hysteresis material, i.e. change the magnetic orientation of the domains. This cycling of the magnetic domains results in dissipation of energy within the member by magnetic hysteresis and in the creation of a corresponding hysteresis drag force opposing the relative movement.

Magnetic hysteresis devices of the kind under discussion are susceptible of various uses. As indicated in the aforementioned copending application, for example, such devices may be employed in a passive hysteresis damping system for stabilizing gravity oriented satellites. The present improved magnetic hysteresis device is intended primarily for use in and will be described in connection with this particular application. However, it will become evident as the description proceeds that the present device may be employed for other purposes and thus should not be regarded as limited in usefulness to satellite stabilization.

An early presentation of the application of a magnetic hysteresis device or damper to the stabilization of gravity oriented satellites is disclosed in the publication entitled "Bell Systems Technical Journal," September 1963 issue, at pages 2195 through 2238. The particular magnetic hysteresis device or damper disclosed in this publication comprises a ferromagnetic disc or ring and a bar magnet which is supported adjacent the ring to produce north-to-south polarization clockwise in one semicircular half of the ring and north-to-south polarization counterclockwise in the other semicircular half of the ring. The magnet and ring are supported for relative rotation. During such relative rotation, the orientation of the magnetic domains within the ring are reversed from clockwise to counterclockwise magnetization, and vice versa, with consequent dissipation of energy in the ring by magnetic hysteresis. A hysteresis drag or damping force or torque is thereby produced between the ring and magnet in opposition to their relative rotation. In the particular satellite damping application referred to, such damping torque is utilized to damp oscillations of stabilizing or damping booms relative to the satellite body in such a way as to damp librations of the satellite and, thereby stabilize the latter in a predetermined orientation relative to the gravity field.

The aforementioned copending application discloses a variety of improved magnetic hysteresis devices or dampers which may be employed to advantage in the above and other applications. These improved devices are characterized by rapid reversal of the hysteresis drag or damping force or torque in response to reversal of the relative movement or rotation of the hysteresis member and magnetizing head. Briefly, this advantage is accomplished by providing the magnetizing head with a sequential array of alternate north and south magnetic poles which are arranged in closely spaced relation along the path or relative movement of the hysteresis member with respect to the magnetizing head such that only a relatively slight relative movement of the head and member is required for cycling, i.e. reversal of the magnetic orientation, of the magnetic domains within the member.

The existing magnetic hysteresis devices or dampers discussed above, however, possess one characteristic which is undesirable in many applications, notably the satellite damping application referred to above, and which this invention seeks to correct. The charatceristic referred to is that of substantially uniform or constant hysteresis damping force or torque throughout the range of relative movement of the hysteresis member and magnetizing head. In the above satellite damping application, for example, the hysteresis damper is coupled across a single axis gimbal joint between the satellite body and inertial damping boom in such a way that the hysteresis drag force or torque produced by the damper damps relative oscillatory motion of the boom with respect to the body occasioned by librations of the satellite. The gimbal joint includes flexure pivots or hinges, such as torsion wires, to develop a restoring torque which causes the boom to oscillate about and gradually seek a predetermined null position.

In the damping systems of this type, three parameters are important, to wit, rapid acquisition of or return to the steady state condition in the null position following a displacement from the null position under the action of an external force, minimum steady state error, i.e. minimum displacement from the null position in the steady state condition, and minimum steady state oscillation amplitude about the null position. A comprehensive analysis was made of constant torque hysteresis dampers to determine the optimum suspension and hysteresis damping characteristic for achieving such rapid acquistion of the steady state, minimum steady state error, and minimum steady state oscillation amplitude in a gravity oriented satellite employing a passive hysteresis damping system of the kind referred to above. This analysis demonstrated that a relatively large hysteresis damping torque provides rapid acquisition but yields poor steady state performance, while a low hysteresis damping torque provides good steady state performance with relatively slow acquisition of the steady state condition. The only solution to the dilemma thus posed by the constant torque hysteresis damper is the selection of an intermediate damping torque value which represents a compromise between the damping torque required for most rapid acquisition and the damping torque required for optimum steady state performance. This compromise damping torque, however, fails to utilize or develop the ultimate damping capability inherent in the satellite stabilizing system.

SUMMARY OF THE INVENTION

The present invention provides a magnetic hysteresis device which may be employed as a hysteresis damper and whose primary advantage, when so employed, resides in the fact that the damper retains the advantages of both the high constant torque and low constant torque damping systems discussed above. It is significant to recall in this regard, however, that while the present magnetic hysteresis device is ideally suited for and will be disclosed in connection with its use as a hysteresis damper, more particularly a hysteresis damper for a passive satellite stabilizing system, the device is capable of many other uses including those referred to earlier.

In one of its aspects, the invention provides a magnetic hysteresis device which may be characterized generally as a variable force or torque hysteresis device or damper that develops a hysteresis drag or damping force or torque whose magnitude is varied or modulated in accordance with a predetermined function of the relative displacement of the hysteresis member and magnetizing head. A disclosed embodiment of the invention, for example, is arranged to develop a hysteresis damping torque which increases progressively from a minimum to a maximum in response to relative rotation of the hysteresis member and magnetizing head in either direction from the null position. According to the present invention, this hysteresis force or torque modulating function may be achieved by varying either the level of magnetization or the quantity of hysteresis material that is worked or cycled to a constant dissipation per unit volume per cycle. The latter method is preferred because of its simplicity and superior force or torque regulation and may be accomplished by utilizing a shaped hysteresis member whose effective cross-section varies in accordance with the desired variation in the hysteresis drag or damping force or torque. In the above-mentioned disclosed embodiment, for example, the hysteresis member comprises a pivotal vane of hysteresis material whose effective radial width increases progressively in either direction about the rotation axis of the vane from a minimum width section of the vane located midway between its ends. This varying effective cross-section of the hysteresis member or vane provides a correspondingly varying hysteresis drag or damping force or torque because of the variation in the magnetic coupling between the vane and magnetizing head, i.e., the variation in the number of magnetic domains within the vane which undergo an alteration of orientation or reversal cycle under the influence of the alternating magnetic fields of the magnetizing head during relative rotation of the vane and head.

In each of the above methods of hysteresis force or torque modulation or regulation, a large variation in the hysteresis force or torque may be accompanied by an undesirable non-dissipative magnetic spring force or torque, referred to herein as magnetic spring bias force or torque, that requires some degree of compensation. This bias force urges the member and head relative to one another in a direction to increase the magnetic coupling between the member and head, i.e. in a direction to locate a major cross-section of the member within the magnetic field of the head. Conceivably, this bias force may be used to advantage in some applications. In other applications, however, notably the satellite damping application referred to earlier, such a magnetic spring bias force may be undesirable. In these cases, the invention provides the hysteresis member with a mass of magnetic material of relatively low hysteresis loss and varying cross-section. The action of the magnetic field of the magnetizing head on this magnetic mass develops a non-dissipative magnetic spring force, referred to herein as a compensating magnetic spring force, in opposition to the non-dissipative magnetic spring bias force. As will appear from the ensuing description, the compensating magnetic mass of the hysteresis member may be shaped in such a way that the compensating magnetic spring force just neutralizes the magnetic bias force or overrides the bias force to provide a restoring torque for urging the hysteresis member and magnetizing head to a given null position.

BRIEF DESCRIPTION OF THE DRAWINGS

In the drawings:

FIG. 1 is a semi-diagrammatic perspective view of a magnetic hysteresis device according to the invention;

FIG. 2 is an enlarged fragmentary plan view looking in the direction of the arrow 2 in FIG. 1;

FIG. 3 is a perspective view of a space satellite having a passive stabilizing system which employs the present magnetic hysteresis device as a hysteresis damper;

FIG. 4a is a constructed or idealized hysteresis loop of a present magnetic hysteresis device;

FIG. 4b is an actual test hysteresis loop of a present magnetic hysteresis device;

FIG. 5 is an elevational view of a modified magnetic hysteresis device according to the invention;

FIG. 6 is an enlarged section taken on line 6—6 in FIG. 5;

FIG. 7 illustrates a modified hysteresis vane configuration for the present magnetic hysteresis device; and FIG. 8 illustrates a further modified hysteresis vane configuration.

DESCRIPTION OF THE PREFERRED EMBODIMENTS

In general terms, the invention provides a shaped magnetic hysteresis device, represented in FIGS. 1–2a of the drawings by the magnetic hysteresis device or damper 10, having a hysteresis member 12 and at least one magnetizing head 14 positioned adjacent a surface of the member. The member and head are mounted on a supporting structure 16 for relative movement of the member and head along a direction line 18 parallel to the surface. The hysteresis member and magnetizing head are thus supported in such a way that the relative movement of the member with respect to the head occurs along a path of relative movement parallel to the surface and direction line. The hysteresis member 12 is composed of a magnetizable hysteresis material 12a which is characterized by a relative high magnetic hysteresis loss. The hysteresis member may be composed of any suitable hysteresis material, such as 3½% chrome steel, that is easily magnetized and yet capable of dissipating energy when subjected to a cycle of charging magnetization. The magnetizing head 14 includes magnetic circuit means 20 providing a sequential array of magnetic fields of varying polarity within magnetic field regions 22. These magnetic field regions extend opposite the magnetizing head 14, within the path of relative movement of the hysteresis member 12 with respect to the head, and are spaced along the path. As will appear presently, the magnetizing head 14 is preferably of the type disclosed in the aforementioned copending application but may comprise other magnetizing head configurations capable of providing the requisite varying magnetic field regions.

It is now evident that during relative movement of the hysteresis member 12 and magnetizing head 14 in either direction, the magnetic domains within the hysteresis material 12a of the member are exposed to successive magnetic fields of varying polarity. In any given relative position of the member and head, the magnetic domains currently located within the magnetic field regions 22 assume a magnetic orientation corresponding to the polarity of the magnetic fields within the respective field regions. As the domains undergo relative movement through these regions and to the adjoining regions, they are exposed to magnetic field changes or reversals which work or cycle the magnetic orientation of the domains. Thus, during continued relative movement of the hysteresis member and magnetizing head in either direction, magnetic domains within the member undergo effectively continuous cycling or orientation changes as the domains pass from one magnetic field region to the next. This change in the orientation or cycling of the magnetic domains creates a magnetic hysteresis loss and resultant energy dissipation in the hysteresis member. Such energy dissipation, in turn, results in heating of the members and in the creation of a hysteresis drag force opposing the relative movement.

As noted earlier, in the existing magnetic hysteresis devices of this kind, the hysteresis drag force remains essentially consist throughout the range of relative movement of the hysteresis member and magnetizing head. According to one important aspect of this invention, the hysteresis drag force is varied or modulated in accordance with a predetermined function of the relative displacement of the hysteresis member 12 and magnetizing head 14 from a given null position. It will be recalled that this force modulation may be achieved by varying either the level of magnetization or the quantity of hysteresis material that is worked or cycled to a constant dissipation per unit volume per cycle. In the disclosed embodiment of the invention, the force modulating function is accomplished by the latter method, which is the preferred method because of its simplicity and superior force regulation characteristics. To this end, the hysteresis member is shaped to have an effective cross-section which varies in accordance with the desired variation in the hysteresis drag force. As a consequence, the number of magnetic domains within the hysteresis material which are cycled or reversed in orientation in response to a given incremental relative movement of the member and head, and hence the hysteresis drag force developed in the hysteresis device, are dependent upon the relative position of the member and head.

The hysteresis drag force thus varies in accordance with a predetermined function of the relative displacement of the hysteresis member and magnetizing head from a given null position, which function is determined by the varying effective cross-section of the member. As will now be understood, and as will become further evident from the ensuing description, the hysteresis member may be shaped to provide any desired functional relation between the drag force and displacement. The particular hysteresis device 10 under discussion, for example, is designed for use in a passive satellite stabilizing system of the kind referred to earlier and is arranged to provide a hysteresis damping force or torque which increases progressively in response to relative displacement or rotation of the magnetizing head and hysteresis member in either direction from a null position.

As noted earlier, and as will become evident from the following description, the action of the magnetic fields of the magnetizing head 14 on the non-uniform cross-section of the hysteresis member 12 produce a magnetic bias force which urges the member and head relative to one another in a direction to increase the magnetic coupling therebetween. A further important aspect of the invention is concerned with compensating for or neutralizing this bias force. To this end, the invention supplements the hysteresis member with a mass 12b of magnetic material, such as Mumetal, characterized by relatively low hysteresis loss. The action of the magnetic field of the magnetizing head 14 on this magnetic mass produces a non-dissipative compensating magnetic spring force opposing the non-dissipative magnetic spring bias force. As hereinafter discussed, the compensating magnetic mass may be shaped to partially compensate, neutralize, or override the bias force on the hysteresis member.

Referring now in more detail to the drawings, the illustrated magnetic hystersis device 10 is an oscillation damper. The hysteresis member 12 of the device is an arcuate vane carried by a rotor 24. Rotor 24 has a central shaft 26 and a cross shaft 28 centrally joined to and extending crosswise of the central shaft. This hysteresis vane 12 is disposed in the plane normal to the central rotor shaft 26 and containing the rotor cross shaft 28 and is rigidly secured at its ends to the cross shaft in such a way that the vane is coaxially disposed relative to the rotor axis. Extending longitudinally of the central rotor shaft 26, and secured to the ends of this shaft and the supporting structure 16, are flexure hinges or torsion wires 30. Thus, the rotor is supported by the torsion wires for rotation on its central axis.

The magnetizing head 14 is fixed to and remains stationary with the supporting structure 16. As will be observed in the drawings, the particular hysteresis damper illustrated has a second magnetizing head which is also fixed in the supporting structure in such a way that the two heads straddle the hysteresis vane 12. The two magnetizing heads 14 are essentially identical. As noted earlier, any magnetizing head configuration capable of providing the requisite alternately reoriented or reversed magnetic field arrays may be employed in the present hysteresis device. The particular magnetizing heads illustrated are of the type disclosed in the aforementioned copending application and are preferred for the reason that they provide rapid reversal of the hysteresis damping force or torque in response to reversal of the relative movement or rotation of the hysteresis vane and magnetizing heads. Since the actual construction of the magnetizing heads forms no part of the present invention, and is fully disclosed in the copending application, it is unnecessary to describe these heads in detail in the present disclosure. Suffice it to say, that each magnetizing head has a number of permanent magnets 32 and pole piece 34 which are arranged in alternate sequence, as shown, to provide an array of alternate north and south magnetic poles N, S disposed in closely spaced relation along the path of movement or rotation of the hysteresis vane 12. The like poles on the two heads are aligned crosswise of the path, as may be readily observed in the drawings. The adjacent north and south poles of each head define therebetween the magnetic field regions 22 of the respective head.

It will now be understood, therefore, that there exists within the adjacent magnetic field regions of each magnetizing head magnetic fields of opposite orientation or polarity. When the illustrated magnetizing heads each have but three magnetic pole tips and, therefore, two magnetic fields of opposite polarity, the number of poles and fields may be increased by employing one of the other magnetizing head configurations disclosed in the copending application. As explained in the copending application, the close spacing of the adjacent magnetic poles of each magnetizing head is effective to provide the advantage, just mentioned, i.e., rapid reversal of the hysteresis damping torque in response to reversal of the direction of rotation or oscillation of the hysteresis vane 12 relative to the magnetizing heads 14.

It will be recalled that one important aspect of the present invention is concerned with the fact that the present hysteresis device or damper 10 produces a hysteresis drag or damping force or torque which varies in accordance with a predetermined function of the relative displacement of the hysteresis vane 12 relative to the magnetizing heads 14. In this regard, it will be observed that the hysteresis material 12a of the illustrated hysteresis vane has a uniform thickness but varies in radial width from end to end. More specifically, the hysteresis material has a minimum radial width midway between its ends and progressively increases in radial width toward each end.

It is now evident that during oscillation of the damper rotor 24, the hysteresis vane 12 oscillates back and forth between the magnetizing heads 14 and through the magnetic field regions 22 of the heads. The magnetic domains within the vane are thus exposed to rapid magnetic field reversal and undergo correspondingly rapid cycling or orientation reversals as the domains pass from one field region to the next. Energy is thereby dissipated within the vane, and a hysteresis damping torque is developed which rapidly reverses as the direction of rotation of the vane reverses so as to oppose or damp rotor oscillation. The magnetic coupling between the vane and heads, that is the number of magnetic domains within the vane which experience a magnetic field reversal and thereby an alteration of orientation or reversal in response to given incremental displacement of the rotor 24, obviously vary in accordance with the effective hysteresis cross-section of that portion of the vane currently situated between the magnetizing heads 14. Thus, the hysteresis damping torque which is developed in response to rotation of the rotor in either direction is dependent upon and varies in accordance with the angular position of the rotor relative to the magnetizing heads. More precisely, the damping torque varies in accordance with a function of the relative displacement of the rotor from a null position wherein the minimum cross-section or central minimum radial width section of the vane is centered relative to the magnetizing heads. In the patricular hysteresis damper illustrated, for example, the cross-section of the hysteresis material 12a, and hence the damping torque, increases progressively in response to rotation of the rotor 24 in either direction from the null position. Moreover, rotation of the rotor in either direction from the null position twists the rotor flexure or torsion wires 30 to create a restoring torque on the rotor in the direction of the null position. This restoring torque tends to cause the rotor to oscillate about and ultimately assume a steady state condition in the null position as the rotor oscillations are gradually damped following displacement of the rotor from the null position by a momentary external force.

Because of its variable damping torque characteristic, the illustrated hysteresis damper 10 is uniquely adapted for the satellite stabilizing application referred to earlier. FIG. 3, for example, illustrates one gravity oriented satellite configuration in which the hysteresis damper may be employed to advantage. The particular satellite configuration illustrated has a satellite body 36 mounting fixed, generally longitudinally oriented masts 38 and a laterally extending inertial damping boom 40. The boom extends diametrically through and beyond opposite sides of the satellite body, and through longitudinal clearance slots in the body, as shown. A present hysteresis damper is utilized to damp oscillatory movement of the boom relative to the satellite body. In this case, the damper is mounted within the satellite body in such a way that the body forms the supporting structure 16 of the damper. The ends of the cross shaft 28 of the damper rotor 24 are longitudinally extended to form the damping boom 40. The hysteresis damper is arranged with its rotor axis normal to and located in a plane containing the axis of the satellite body, whereby the damping boom is supported for oscillation in a plane containing the body axis.

The stabilizing action which is provided by the illustrated passive satellite stabilizing system is well understood by those skilled in the art and need not be explained in detail in this disclosure. Suffice it to say that the illustrated stabilizing system is effective to rapidly damp librations of and thereby stabilize the satellite in a predetermined orientation relative to the gravity field. During stabilization, the satellite librations induce oscillatory motion of the damping boom 40 about the axis of the damper rotor 24. The damping boom is thereby subjected to both a hysteresis damping torque, resulting from the hysteresis damping action of the hysteresis damper 10, and a restoring torque resulting from twisting of the torsion wires 30 of the damper rotor 24. The damping torque damps the oscillations of the boom and thereby the librations of the satellite. The restoring torque causes the rotor, and thereby the damping boom, to oscillate about and ultimately assume a steady state condition in the null position, referred to earlier. In this null position, the damping boom 40 extends normal to the satellite body axis. As will appear from the ensuing discussion, the present hysteresis damper 10 is effective to achieve rapid acquisition of the steady state condition in the null position, minimum steady state displacement error from the null position, and minimum steady state oscillation about the null position.

At this point, it is significant to recall that the non-uniform shape or cross-section of the hysteresis vane 12 creates a nondissipative magnetic spring bias force or torque along the line of relative movement or rotation of the vane and magnetizing heads 14. This bias torque tends to urge the vane in a direction to increase the magnetic coupling between the vane and the magnetizing heads, i.e., in a direction to locate a major cross-section of the vane hysteresis material 12a within the magnetizing fields of the heads. With the particular hysteresis vane contour illustrated, for example, this bias torque acts in opposition to the restoring torque of the torsion wires 30 and tends to drive the vane toward one side or the other of its null position. In other words, the bias torque produces a decentering action on the vane.

As noted earlier, a second important aspect of the invention is concerned with providing the hysteresis vane 12 with a compensating magnetic mass 12b characterized by a relatively low hysteresis loss for producing a compensating magnetic spring force in opposition to the above-mentioned decentering bias torque. In this regard, it will be observed that the action of the magnetic field of the magnetizing heads 14 on this compensating magnetic mass produces a non-dissipative magnetic spring force, i.e., a compensating magnetic spring force, on the vane along the line of its relative movement with respect to the magnetizing heads. According to the present invention, the compensating magnetic mass 12b is shaped to provide the hysteresis device or damper with the optimum compensating magnetic spring force for each particular application. For example, the compensating mass may be shaped to generally complement the hysteresis material 12a of the vane 12 in such a way that the magnetic bias or decentering torque and the compensating magnetic torque on the vane substantially neutralize or balance one another. Alternatively, the compensating mass may be shaped to provide an over-compensating spring action for aiding the restoring or centering torque developed by twisting of the damper rotor torsion wires 30.

To illustrate some of the design considerations involved in determining and achieving the proper hysteresis damping and compensating magnetic spring values in the present hysteresis devise or damper, consider the satellite stabilizing application illustrated in FIG. 3. In order to satisfy the need for both rapid acquisition of the steady state condition and small steady state oscillation, the hysteresis torque should increase with increasing angles of oscillation. This requirement is satisfied by the hysteresis vane contour illustrated. However, in some applications of this variable torque program, it might be permissible or desirable to achieve maximum hysteresis torque at some intermediate displacement or excursion and then maintain this maximum torque up to the limiting displacement or excursion. By using the maximum allowable rate of increase in hysteresis torque up to this intermediate excursion, it may not be necessary to provide any further hysteresis torque increase beyond the intermediate excursion. Such a modified torque program, of course, would be achieved by proper contouring of the hysteresis material 12a of the vane 12. Further, in order to prevent the possibility of a large undesirable zero torque repose angle or error, i.e., acquisition of a stable condition at an angle of repose displaced from the predetermined null position, upon return of the hysteresis vane from a large excursion, the return branch of the hysteresis loop defining the reversal cycle of the magnetic domains within the vane should cross the zero torque axis near the zero displacement or angular position. To satisfy this requirement, the dissipative hysteresis torque which retards the return of the hysteresis vane from such a large excursion should always be less than the summation of the several non-dissipative torques active on the ring, i.e., the centering torque produced by the damper rotor flexure hinges on torsion wires 30, the magnetic spring bias force on the hysteresis material 12a, and the compensating magnetic spring force on the compensating magnetic mass 12b. Reduction of the rotation angle, i.e., angle of the vane relative to its null position, at which the hysteresis loop crosses the zero torque axis is achieved by tailoring or contouring the compensating magnetic mass to provide over-compensation of the magnetic spring bias or decentering force on the hysteresis vane. This produces a steeper combined damper spring rate near the origin of the hysteresis plot. A further aid in attaining small zero torque crossover angles involves limiting the rate of increase of the hysteresis torque in the regions very near the origin. This convergence of the hysteresis loop near the origin provides a marked reduction of the zero torque, uncertainty angle inherent in hysteresis damper systems.

FIG. 4a illustrates one possible damper hysteresis loop for the satellite stabilizing application referred to above. This hysteresis loop is an idealized loop which has been constructed to illustrate the characteristics just described. The illustrated loop shows the hysteresis damping torque changing monotonically as the angular position of the hysteresis vane changes from one extreme to the other. Increased damping torque at large angles is evident, and the extreme angles illustrate attainment of a maximum hysteresis torque capability. Features contributing to zero torque crossover at small rotation angles are (1) reduced hysteresis torque at the origin, (2) limitation of the rate of increase in hysteresis torque in the region near the origin, and (3) over-compensation for the non-dissipative decentering torque resulting from the non-uniform cross-section of the hysteresis vane to obtain a steeper slope near the origin. In the intermediate zone from five degrees to 30 degrees, the magnetic spring over-compensation is reduced to zero and the rate of increase in hysteresis torque is near the maximum permissible value with safe avoidance of zero torque crossover at the larger angles of oscillation. As just noted, the hysteresis curve of FIG. 4a is an idealized curve which has been constructed to illustrate the above-discussed damper characteristics for the satellite stabilizing application. An actual test hysteresis curve is shown in FIG. 4b.

A typical design procedure for obtaining these characteristics may involve the following steps:

(1) Provide magnetizing heads and a hysteresis vane which will produce the maximum required hysteresis damping torque at the limiting angle of rotation of the vane when the major cross-section of the hysteresis vane occupies the full radial width of the heads.

(2) Calculate the required variation of the radial width of the hysteresis vane to produce the desired variation in the hysteresis damping torque.

(3) Provide a compensating magnetic mass on the vane of the proper contour to obtain the required net non-dissipative magnetic spring torque.

Some of the principles and guidelines to aid accomplishment of the third design step above are:

(1) A compensating magnetic spring torque is produced by any configuration of the compensating magnetic mass 12b whereby a given angular displacement of the hysteresis vane 12 relative to the magnetizing heads 14 will change the path length and number of magnetc linkages between the vane and heads. The compensating spring torque thus developed is in the direction that produces increasing linkages.

(2) If the material and thickness of the compensating magnetic mass are selected to produce the same magnetic coupling to the magnetizing heads as the hysteresis material 12a of the vane, neutral compensation is obtained by providing the compensating mass 12b with a contour which complements that of the vane.

(3) If the compensating magnetic mass provides closer magnetic coupling with the magnetizing heads than the hysteresis material 12a of the vane, neutral compensation can be obtained with a lesser slope and cross-section of the compensating mass 12b than the hysteresis material.

(4) Over-compensation to achieve a compensating magnetic spring force which will effect a centering action on the vane may be accomplished by increasing the cross-section of the compensating magnetic mass 12b.

One method of operating the present variable torque hysteresis device or damper involves the employment of a magnetizing force which is high enough to maintain the magnetic flux in the hysteresis material 12a of the vane 12 at the saturation level. It is then obvious that the hysteresis damping torque will be a sole function of the effective hysteresis cross-section of the vane in any given radial plane and that the variation of the outer radius, inner radius, and/or thickness of the vane will produce a corresponding change in the amount of hysteresis material 12a which is magnetically worked or cycled during rotation of the vane. This, in turn, will produce a corresponding variation in the hysteresis damping torque at any given position of the vane relative to the magnetizing heads 14. Operation below the saturation level, however, has been found to be satisfactory when the simple procedure is followed of varying only the outer radius or the inner radius of the vane. Such operation below the saturation level is preferably accomplished by reducing the separation or width of the magnetic gaps in the magnetizing heads 14 to improve the resolution of the torque changes which occur in response to reversal in a direction of rotation of the vane.

In the particular hysteresis damper 10 of the invention under discussion, the compensating magnetic mass 12b generally complements the hysteresis material 12a of the vane. Accordingly, the non-dissipative magnetic spring bias torque and the non-dissipative compensating magnetic spring torque on the vane substantially balance one another. It may be desirable, however, to so shape the compensating mass that the compensating magnetic torque slightly overrides the bias torque to provide a net magnetic centering torque on the vane for aiding the centering torque produced by the damper rotor torsion wires 30.

FIGS. 5 and 6 illustrate a slightly modified hysteresis damper 100 according to the invention in which an alternative technique is employed for obtaining the desired non-dissipative magnetic spring bias torque and compensating magnetic spring torque. In this case, the hysteresis material 102a of the hysteresis vane 102 has a uniform radial width from end to end, and the magnetic compensating mass 102b is deposited on or otherwise applied as an overlay to the surface of the hysteresis material in such a way as to effectively mask one portion and expose the remaining portion of this material. In this particular form of the invention, the compensating magnetic overlay effectively shields or isolates the underlying portion of the hysteresis material from the magnetic field of the magnetizing heads 14. Accordingly, during relative rotation of the head and vane, only the magnetic domains within the exposed hysteresis portions of the vane experience orientation cycling or reversal under the influence of the alternating magnetic fields of the heads. The modified hysteresis damper is otherwise identical to the earlier hysteresis damper of the invention. It is evident at this point that the hysteresis material and compensating magnetic overlay or mass of the modified damper may be shaped to yield substantially the same hysteresis damping torque and magnetic spring torque characteristics as the earlier damper.

It is now evident that the hysteresis material and compensating magnetic mass of a present variable force or torque hysteresis device or damper may be tailored or shaped to yield a wide range of hysteresis damping torque and magnetic spring torque characteristics. FIGS. 7 and 8, for example, illustrate two alternative vane configurations which were tested for use in the satellite stabilizing application referred to earlier. In each figure, the reference character H denotes the hysteresis material and the reference character C denotes the compensating magnetic mass of the vane. Each of these vane configurations obviously provides a hysteresis damping torque which increases to a maximum at some intermediate angle of rotation or excursion of the vane from its null position and then remains constant beyond this excursion. Obviously, the particular shape or contour of the hysteresis material and the compensating magnetic mass will depend upon each particular application of the hysteresis device or damper.

It is now evident that the invention herein described and illustrated possesses all of the features and advantages referred to earlier. It will be understood, of course, that while the invention has been disclosed in connection with certain physical embodiments thereof and certain illustrative applications thereof, modifications of the invention are possible within the spirit and scope of the following claims. In this regard, for example, it will be understood that the features of the invention may be utilized in variable force or torque hysteresis devices or dampers having other than flat, vane-like hysteresis members. For example, the hysteresis member or vane of a present hysteresis device may have any one of the various shapes disclosed in the aforementioned copending application.

The embodiments of the invention in which an exclusive property or privilege is claimed are defined as follows:

1. A variable force magnetic hysteresis device comprising:
   a magnetically permeable hysteresis member characterized by a relatively high hysteresis loss;
   a magnetizing head positioned adjacent a surface of said member;
   means supporting said member and head for relative movement along a direction line generally parallel to said surface such that relative movement of said member with respect to said head occurs along a given path;
   said head including a sequential array of magnetic poles disposed in spaced relation along said direction line and defining therebetween magnetic field regions, the adjacent poles having opposite polarity and the alternate poles having like polarity, whereby the adjacent poles produce magnetic fields of different polarity within said magnetic field regions, respectively, and said poles being located closely adjacent said surface, whereby the magnetic domains within said member are subjected to magnetic field changes during relative movement of said head and member to create a hysteresis drag force opposing the relative movement; and
   drag force modulating means whereby the magnitude of said drag force varies in accordance with a function of the relative displacement of said head and member along said direction line.

2. A magnetic hysteresis device according to claim 1, wherein:
   the effective cross-section of said member in planes normal to said direction line varies along said member to provide said force modulating means.

3. A magnetic hysteresis device according to claim 1, wherein:
   said member has a generally uniform thickness; and
   the width of said member measured normal to said direction line and parallel to said surface varies along said member to provide said force modulating means.

4. A variable force magnetic hysteresis device comprising:
   a magnetically permeable hysteresis member characterized by a relatively high hysteresis loss;
   a pair of magnetizing heads disposed in confronting relation at opposite sides and adjacent the surface of said member;
   means supporting said member and heads for relative movement along a direction line generally parallel to said surfaces such that the relative movement of said member with respect to said heads occurs along a given path passing between said heads;
   said heads including a sequential array of magnetic poles disposed in closely spaced relation along said direction line and defining therebetween magnetic field regions, the corresponding poles on said heads being aligned laterally of said direction line and having like polarity, the adjacent poles on each head having opposite polarity and the alternate poles on each head having like polarity, and said poles being located closely adjacent their respective confronting member surfaces, whereby the magnetic domains within said member are subjected to magnetic field changes during relative movement of said heads and member to create a hysteresis drag force opposing the relative movement; and
   the cross-section of said member in planes normal to said direction line varies along said member whereby the magnitude of said force varies in accordance with a predetermined function of the relative displacement of said heads and member along said direction line.

5. A magnetic hysteresis device according to claim 4, wherein:
   said member has a generally uniform thickness; and
   the width of said member measured normal to said direction line and parallel to said surfaces varies along said member.

6. A rotary, variable torque magnetic hysteresis device comprising:

a generally flat magnetically permeable hysteresis vane characterized by a relatively high hysteresis loss;

a magnetizing head positioned adjacent a surface of said vane;

means supporting said vane and head for relative rotation about an axis such that said vane has a path of relative movement with respect to said head and relative movement of said vane with respect to said head occurs along a circular direction line generally parallel to said surface;

said head including magnetic circuit means for producing a sequential array of magnetic fields of different polarity within magnetic field regions, respectively, located in said path opposite said head and spaced along said path, whereby the magnetic domains in said member are subjected to successive magnetic field changes during relative rotation of said head and vane to create a hysteresis drag torque opposing the relative rotation; and the width of said vane measured radially of said axis varies along with said vane whereby the magnitude of said hysteresis drag torque varies in accordance with a function of the relative angular displacement of said head and vane.

7. A rotary, variable torque magnetic hysteresis device comprising:

a magnetically permeable hysteresis member characterized by a relatively high hysteresis loss;

a magnetizing head positioned adjacent a surface of said member;

means supporting said member and head for relative rotation about an axis such that said member has a path of relative movement with respect to said head and relative movement of said member with respect to said head occurs along an accurate direction parallel to said surface;

said head including a sequential array of magnetic poles disposed in spaced relation along said direction line and defining therebetween magnetic field regions, the adjacent poles having opposite polarity and the alternate poles having like polarity, whereby the adjacent poles produce therebetween magnetic fields, and said poles are located closely adjacent said surface, whereby the magnetic domains in said member are subjected to successive magnetic field changes during relative rotation of said head and member to create a hysteresis drag torque opposing the relative rotation; and drag torque modulating means whereby the magnitude of said hysteresis drag torque varies in accordance with a function of the relative angular displacement of said head and member.

8. A magnetic hysteresis device comprising:

a magnetically permeable member composed of a hysteresis material having a relatively high hysteresis loss and a magnetic material having a relatively low hysteresis loss;

magnetizing means positioned adjacent said member;

means supporting said member and magnetizing means for relative movement such that the relative movement of said member with respect to said magnetizing means occurs along a given path;

said magnetizing means including magnetic circuit means providing a number of magnetic fields of different polarity within magnetic field regions, respectively, located in and spaced along said path whereby magnetic domains within said hysteresis material are subjected to magnetic field changes during relative movement of said member and magnetizing means to create a hysteresis drag force opposing the relative movement and said magnetic material is subjected to a magnetic spring force in the direction of the relative movement; and force modulating means, whereby the magnitude of said hysteresis drag force varies in accordance with a function of the relative displacement of said magnetizing means and member along said path.

9. A magnetic hysteresis device comprising:

a magnetically permeable member composed of a hysteresis material having a relatively high hysteresis loss and a magnetic material having a relatively low hysteresis loss;

magnetizing means positioned adjacent said member;

means supporting said member and magnetizing means for relative movement such that the relative movement of said member with respect to said magnetizing means occurs along a given path;

said magnetizing means including magnetic circuit means providing a number of magnetic fields of different polarity within magnetic field regions, respectively, located in and spaced along said path whereby magnetic domains within said hysteresis material are subjected to magnetic field changes during relative movement of said member and magnetizing means to create a hysteresis drag force opposing the relative movement and said magnetic material is subjected to a magnetic spring force in the direction of the relative movement; and force modulating means, whereby the magnitude of said magnetic spring force varies in accordance with a function of the relative displacement of said magnetizing means and member along said path.

10. A magnetic hysteresis device according to claim 9, including:

force modulating means whereby the magnitude of said hysteresis drag force also varies in accordance with a function of the relative displacement of said magnetizing means and member along said path.

11. A magnetic hysteresis device according to claim 10, wherein:

the effective cross-sections of said hysteresis material and said magnetic material in planes normal to said path vary along said member to provide said force modulating means.

12. Variable force magnetic hysteresis device comprising:

a magnetically permeable hysteresis member characterized by a relatively high hysteresis loss;

a magnetizing head positioned adjacent a surface of said member;

means supporting said member and head for relative movement along a direction line generally parallel to said surface such that the relative movement of said member with respect to said head occurs along a given path;

said head including magnetic circuit means producing a sequential array of magnetic fields of different polarity within magnetic field regions, respectively, located in said path opposite said head and spaced along said path, whereby the magnetic domains within said member are subjected to magnetic field changes during relative movement of said head and member to create a hysteresis drag force opposing the relative movement;

drag force modulating means whereby the magnitude of said drag force varies in accordance with a function of the relative displacement of said head and member along said direction line and said head and member are subjected to a magnetic spring bias force generally parallel to said direction line; and a compensating magnetic mass on said member on which said magnetic fields act to produce a compensating magnetic spring force opposing said magnetic spring bias force.

13. A magnetic hysteresis device according to claim 12, wherein:

said magnetic spring bias force and said compensating magnetic spring force substantially balance one another throughout the range of relative movement of said member and head.

14. A magnetic hysteresis device according to claim 13, wherein:
said member has a given null position relative to said head;
said hysteresis drag force increases progressively in response to relative movement of said member with respect to said head in either direction from said null position; and
said compensating magnetic spring force slightly overrides said magnetic bias force and urges said member to said null position.

15. A variable force magnetic hysteresis device comprising:
a magnetically permeable hysteresis member characterized by a relatively high hysteresis loss;
a magnetizing head positioned adjacent a surface of said member;
means supporting said member and head for relative movement along a direction line generally parallel to said surface such that the relative movement of said member with respect to said head occurs along a given path;
said head including magnetic circuit means producing a sequential array of magnetic fields of different polarity within magnetic field regions, respectively, located in said path opposite said head and spaced along said path, whereby the magnetic domains within said member are subjected to magnetic field changes during relative movement of said head and member to create a hysteresis drag force opposing relative movement;
said member having a minimum effective cross-section in a given plane normal to said direction line and the effective cross-section of said member in planes normal to said direction line increasing progressively in either direction along said member from said given plane, whereby said hysteresis drag force increases progressively with displacement of said member relative to said head from a null position wherein said minimum cross-section is centered relative to said head;
the action of said magnetic fields on the varying cross-section of said member producing a magnetic decentering force on said member which urges said member relative to said head in a direction to locate a major cross-section of said member opposite said head;
a compensating mass of magnetic material on said member characterized by a relatively low hysteresis loss and on which said magnetic fields act to produce a compensating magnetic spring force opposing said decentering force; and
the effective cross-section of said magnetic material progressively diminishing in either direction along said member from said given plane in such a way that said magnetic spring bias force and said compensating magnetic spring force substantially balance one another throughout the range of relative movement of said member and head.

16. A magnetic hysteresis device according to claim 15, wherein:
said member comprises a generally flat hysteresis vane of substantially uniform thickness;
said vane and head are relatively movable in rotation about an axis normal to said vane; and
the effective radial width of said vane increases progressively in either direction along said vane from said given plane.

17. A magnetic hysteresis device according to claim 15, wherein:
said hysteresis member and compensating magnetic mass have substantially the same thickness and are joined edge to edge.

18. A magnetic hysteresis device according to claim 15, wherein:
said compensating magnetic mass comprises an overlay of magnetic material on said member which effectively magnetically masks a portion of said member.

References Cited

UNITED STATES PATENTS

| | | | |
|---|---|---|---|
| 2,642,274 | 6/1953 | Andresen | 310—103 |
| 3,034,744 | 5/1962 | Bancroft | 310—93 |
| 3,169,364 | 2/1965 | Biemiller | 310—36 |
| 3,267,310 | 8/1966 | Ireland | 310—93 |
| 3,358,945 | 12/1967 | Blount | 310—93 |

FOREIGN PATENTS 906,635  9/1962  Great Britain.

MILTON O. HIRSHFIELD, Primary Examiner

R. SKUDY, Assistant Examiner

U.S. Cl. X.R.

244—1